US010880542B1

(12) United States Patent
Rong et al.

(10) Patent No.: US 10,880,542 B1
(45) Date of Patent: Dec. 29, 2020

(54) NEAR-EYE OPTICAL ELEMENT WITH EMBEDDED HOT MIRROR

(71) Applicant: Facebook Technologies, LLC, Menlo Park, CA (US)

(72) Inventors: Wei Rong, San Jose, CA (US); Javier San Agustin Lopez, Palo Alto, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/226,150

(22) Filed: Dec. 19, 2018

(51) Int. Cl.
*G02B 27/14* (2006.01)
*G02B 27/01* (2006.01)
*H04N 13/344* (2018.01)
*G02B 27/09* (2006.01)
*G06F 3/01* (2006.01)

(52) U.S. Cl.
CPC ....... *H04N 13/344* (2018.05); *G02B 27/0172* (2013.01); *G02B 27/0955* (2013.01); *G02B 27/0977* (2013.01); *G06F 3/013* (2013.01); *G02B 2027/0178* (2013.01)

(58) Field of Classification Search
CPC ....................................................... G06F 3/013
See application file for complete search history.

(56) References Cited

U.S. PATENT DOCUMENTS

| 9,632,312 B1* | 4/2017 | Cakmakci | G02B 5/1852 |
|---|---|---|---|
| 10,039,445 B1* | 8/2018 | Torch | A61B 5/4076 |
| 2012/0243102 A1* | 9/2012 | Takeda | G02B 17/086 |
| | | | 359/630 |
| 2013/0114850 A1* | 5/2013 | Publicover | G06K 9/00604 |
| | | | 382/103 |
| 2013/0235442 A1* | 9/2013 | Seike | G02B 26/02 |
| | | | 359/222.1 |
| 2014/0254024 A1* | 9/2014 | Hiraide | G02B 27/0172 |
| | | | 359/633 |
| 2015/0169049 A1* | 6/2015 | Ko | G06F 3/013 |
| | | | 345/156 |
| 2015/0234187 A1* | 8/2015 | Lee | G02C 7/085 |
| | | | 345/8 |
| 2016/0018639 A1* | 1/2016 | Spitzer | G02B 5/30 |
| | | | 345/156 |
| 2016/0282622 A1* | 9/2016 | Hiraide | G02B 6/00 |
| 2016/0334624 A1* | 11/2016 | Zhao | G02B 27/0172 |
| 2016/0357016 A1* | 12/2016 | Cakmakci | G02B 27/0172 |
| 2017/0140224 A1* | 5/2017 | Wilson | G02B 27/0172 |
| 2019/0331922 A1* | 10/2019 | Kim | G02B 26/0825 |

\* cited by examiner

*Primary Examiner* — Md Saiful A Siddiqui
(74) *Attorney, Agent, or Firm* — Freestone Intellectual Property Law PLLC; Aaron J. Visbeek; Andrew J. Cameron

(57) ABSTRACT

A near-eye optical element includes a refractive layer and at least one infrared reflecting layer. The refractive layer has an eyeward side and a scene side. The eyeward side of the refractive layer is disposed opposite of the scene side of the refractive layer. The infrared reflecting layer is embedded in the refractive layer and configured to receive an infrared beam from an infrared illuminator and direct the infrared beam out the eyeward side of the refractive layer to illuminate an eyebox area with infrared light. The infrared reflecting layers are configured to reflect the infrared beam and pass visible light.

14 Claims, 5 Drawing Sheets

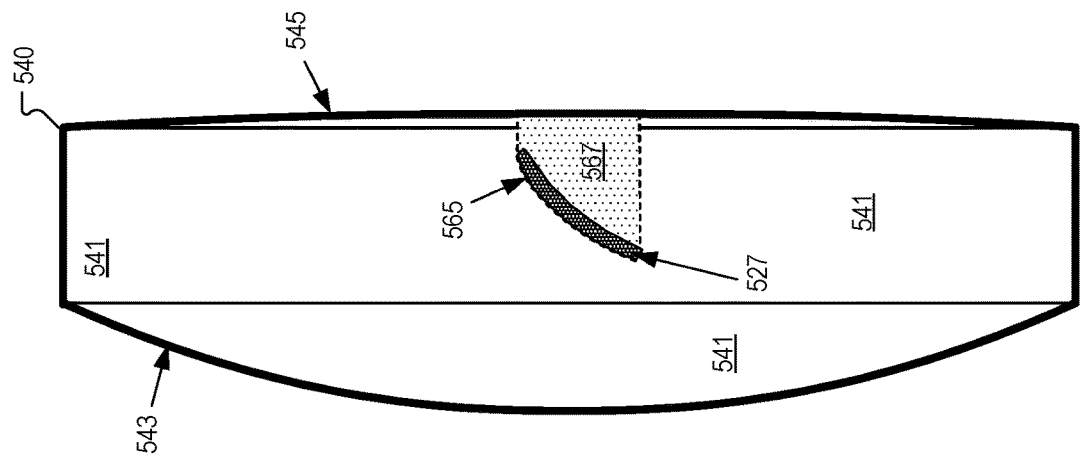
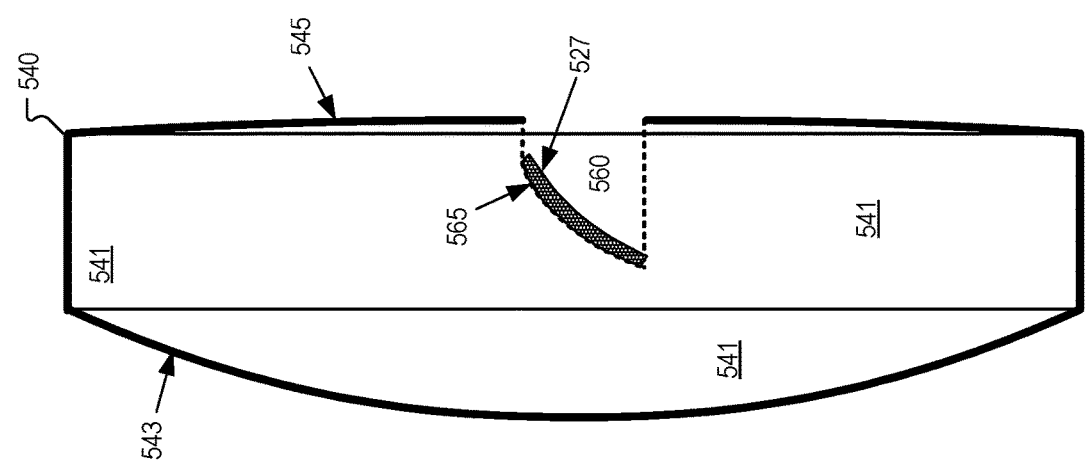
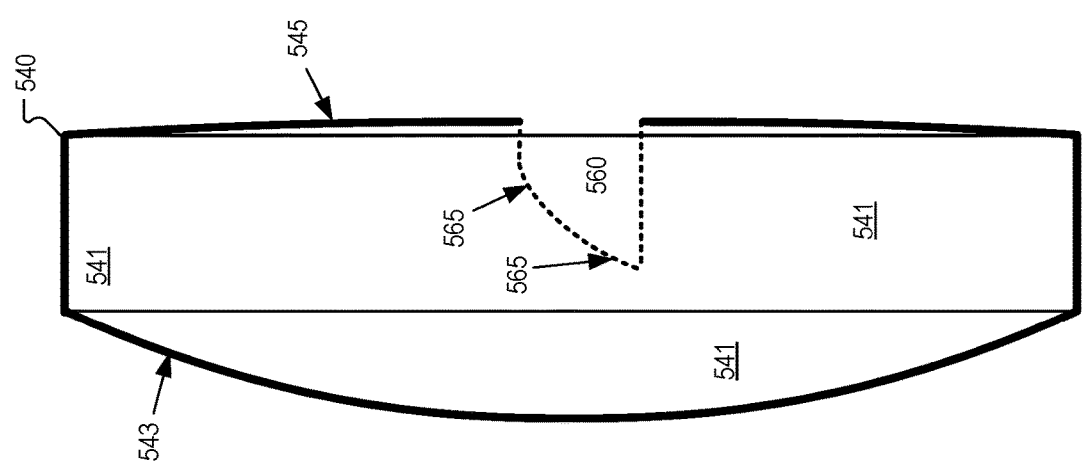

NEAR-EYE OPTICAL ELEMENT WITH EMBEDDED HOT MIRROR

TECHNICAL FIELD

This disclosure relates generally to head mounted displays, and in particular to near-eye optics.

BACKGROUND INFORMATION

Eye-tracking systems may be included in head mounted displays (HMDs) to determine an eye position of a user and adjust images or other settings in response to the determined eye position. Conventional eye-tracking systems may include an infrared LED and an eye-tracking camera. The infrared LED can be positioned on the perimeter of a lens and illuminate the eye with infrared light. An eye-tracking camera capture images of the eye and the images may be compared to determine the eye position.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIGS. 5A-5C illustrate one example of fabricating a near-eye optical element that includes an infrared reflecting layer, in accordance with an embodiment of the disclosure.

DETAILED DESCRIPTION

Embodiments of a head mounted display (HMD) and a near-eye optical element that include one or more embedded hot mirrors are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the disclosure include an HMD and a near-eye optical element with one or more embedded hot mirrors that illuminate an eyebox area with infrared light. Infrared light emitting diodes (LEDs) or infrared laser diodes may emit an infrared beam that propagates through a refractive layer of a near-eye optical element where the infrared beam illuminates the embedded hot mirror. The embedded hot mirror includes an infrared reflecting layer that reflects infrared light to the eyebox area while passing visible light. The one or more hot mirrors may be in a line of sight of the user of the HMD, but since the hot mirrors pass visible light, external scene light will still propagate to the eye of the user. Therefore, in augmented reality (AR) implementations, a view of the external environment of the user is still viewable and in a virtual reality (VR) implementation, the user may view display light from a virtual reality display through the refractive layer that the hot mirrors are embedded in.

In conventional eye-tracking systems, infrared LEDs are typically disposed on an outside perimeter of a viewing lens to illuminate the eyebox area. However, as the lenses for AR and VR increase in size, these infrared LEDs are pushed farther and farther from the eye. As a result, the infrared LEDs illuminate the eyebox area at increasingly oblique angles, which increases the difficulty of eye-tracking for a variety of reasons. Thus, utilizing hot mirrors that can be placed in a refractive material of a lens in the direct line of sight of the user to illuminate the eyebox area with infrared light without noticeably impacting the view of the user is advantageous, in many contexts. These and other embodiments are described in connection with FIGS. 1-5C below.

Figure 1:
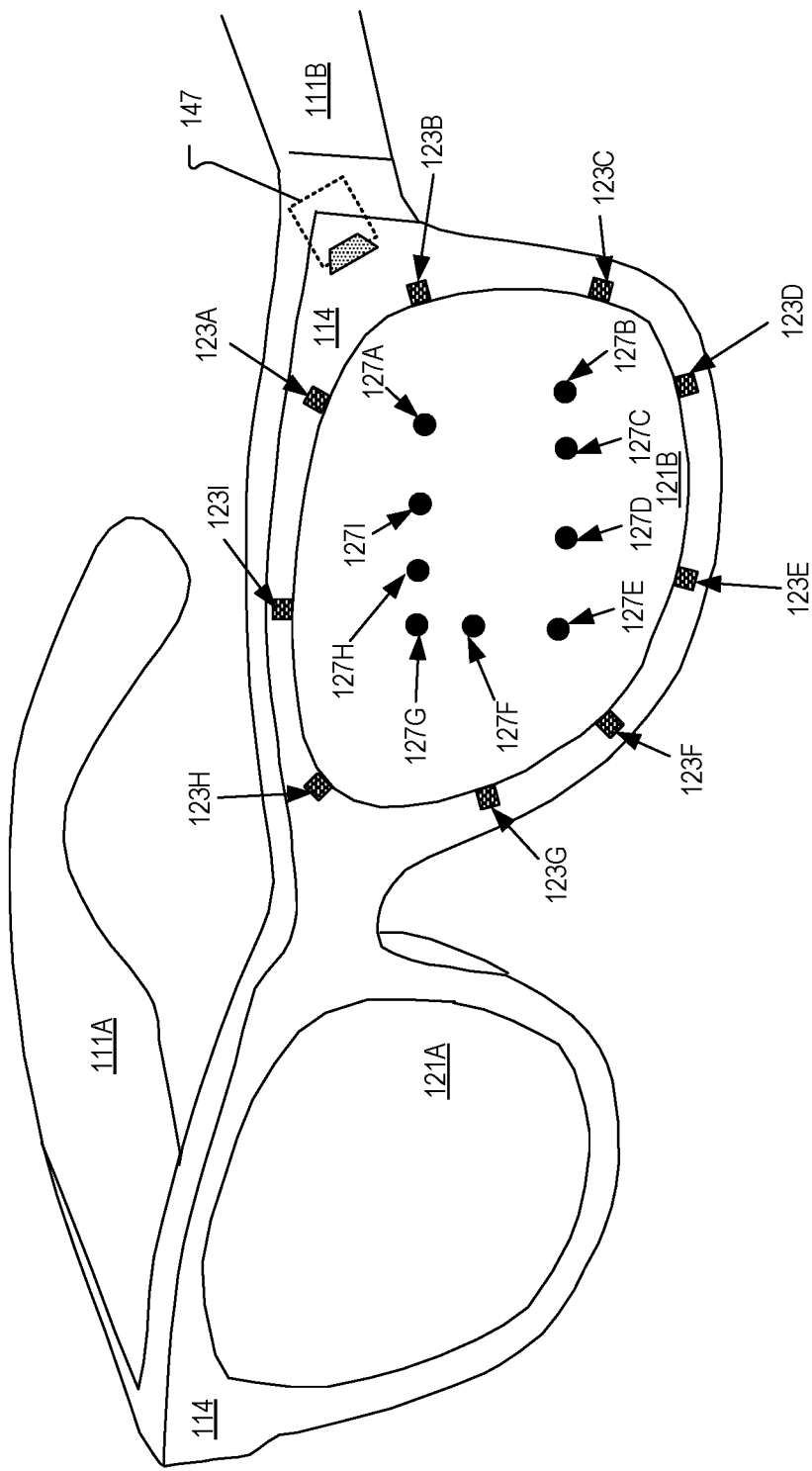
FIG. 1 illustrates an example head mounted display (HMD) that includes infrared illuminators illuminating infrared hot mirrors embedded in a refractive layer of a lens, in accordance with an embodiment of the disclosure.

FIG. 1 illustrates an example HMD 100 including infrared illuminators illuminating infrared hot mirrors embedded in a refractive layer of a lens, in accordance with an embodiment of the disclosure. HMD 100 includes frame 114 coupled to arms 111A and 111B. Lenses 121A and 121B are mounted to frame 114. Lenses 121 may be prescription lenses matched to a particular wearer of HMD or non-prescription lenses. The illustrated HMD 100 is configured to be worn on or about a head of a user of the HMD.

The frame 114 and arms 111 of the HMD 100 may include supporting hardware of HMD 100. HMD 100 may include any of processing logic, wired and/or wireless data interface for sending and receiving data, graphic processors, and one or more memories for storing data and computer-executable instructions. In one embodiment, HMD 100 may be configured to receive wired power. In one embodiment, HMD 100 is configured to be powered by one or more batteries. In one embodiment, HMD 100 may be configured to receive wired data including video data via a wired communication channel. In one embodiment, HMD 100 is configured to receive wireless data including video data via a wireless communication channel.

Lenses 121 may appear transparent to a user to facilitate augmented reality or mixed reality where a user can view scene light from the environment around her while also receiving image light directed to her eye by a display of HMD 100. Consequently, lenses 121 may be considered (or include) an optical combiner. In some embodiments, image light is only directed into one eye of the wearer of HMD 100.

The example HMD 100 of FIG. 1 includes an array of infrared illuminators (e.g. infrared LEDs or infrared laser diodes) 123A-I disposed around a periphery of lens 121B in frame 114. The infrared illuminators 123A-I emit infrared beams to their respective infrared reflecting layer 127A-I so that the infrared reflecting layers 127A-I direct the infrared beam out an eyeward side of lens 121B to illuminate an eyebox area. The illustrated embodiment includes nine infrared illuminators 123 corresponding to nine infrared reflecting layers 127. More or less than nine infrared illuminators or infrared reflecting layers may be used in different embodiments. In the illustrated embodiment, infrared reflecting layers 127 are embedded in a refractive layer of lens 121B and disposed in a line of sight of user. In different embodiments, the infrared reflecting layers 127 may be arranged in different patterns than the illustrated embodiment. The infrared reflecting layers 127 are configured to reflect infrared light while passing visible light and thus periodically referred to as "hot mirrors" in the disclosure. In particular, infrared reflecting layers 127 may be configured to reflect a narrow band of infrared light that is also emitted by the infrared illuminators 123. In one embodiment, the narrow band of infrared light that the infrared reflecting layers 127 are configured to reflect is within a 10 nm range. In one embodiment, the infrared beam emitted by infrared illuminators 123 is centered around 850 nm. Other infrared wavelengths are also contemplated.

In some embodiments, the infrared illuminators 123 may be replaced by lightguide openings that emit infrared beams to the infrared reflecting layers 127A-I. For example, an infrared LED or infrared laser diode may emit infrared light that is confined to a lightguide (by way of total internal reflection or otherwise) and outcoupled at the lightguide openings as the infrared beams. In this way, one infrared LED or infrared laser diode may provide the infrared light to multiple lightguide openings.

Camera 147 may be configured to image the eyebox area and capture images that include the narrow band of infrared light emitted by infrared illuminators 123 while rejecting (and not imaging) other wavelengths of light, including visible light. Eye-tracking camera 147 is positioned to capture images of the eye of a user of the HMD. Eye-tracking camera 147 is positioned in the temple-area of frame 114, in the illustrated embodiment, but an eye-tracking camera may be disposed in any position that allows it to image the eyebox area. In some embodiments, an eye-tracking camera may be embedded in lenses 121 where the aperture of the eye-tracking camera is positioned to receive infrared light reflected off of the eye of the user of HMD 100. In some embodiments, an optical combiner (not illustrated) included in lens 121B directs infrared light reflected by the eye to the eye-tracking camera for imaging purposes. The eye-tracking camera 147 may include an infrared bandpass filter that passes an infrared wavelength band corresponding to the infrared beam emitted by infrared illuminators 123. The bandpass filter may be disposed over an image sensor of the eye-tracking camera and the infrared bandpass filter may reject light outside the infrared wavelength band. The images of the eye captured by camera 147 may be used for eye-tracking purposes. Although camera 147, infrared illuminators 123, and infrared reflecting layers 127 are illustrated on only one side of HMD 100, they of course may be duplicated on the other side of HMD 100 to facilitate infrared imaging of both eyes of a wearer of HMD 100.

Figure 2:
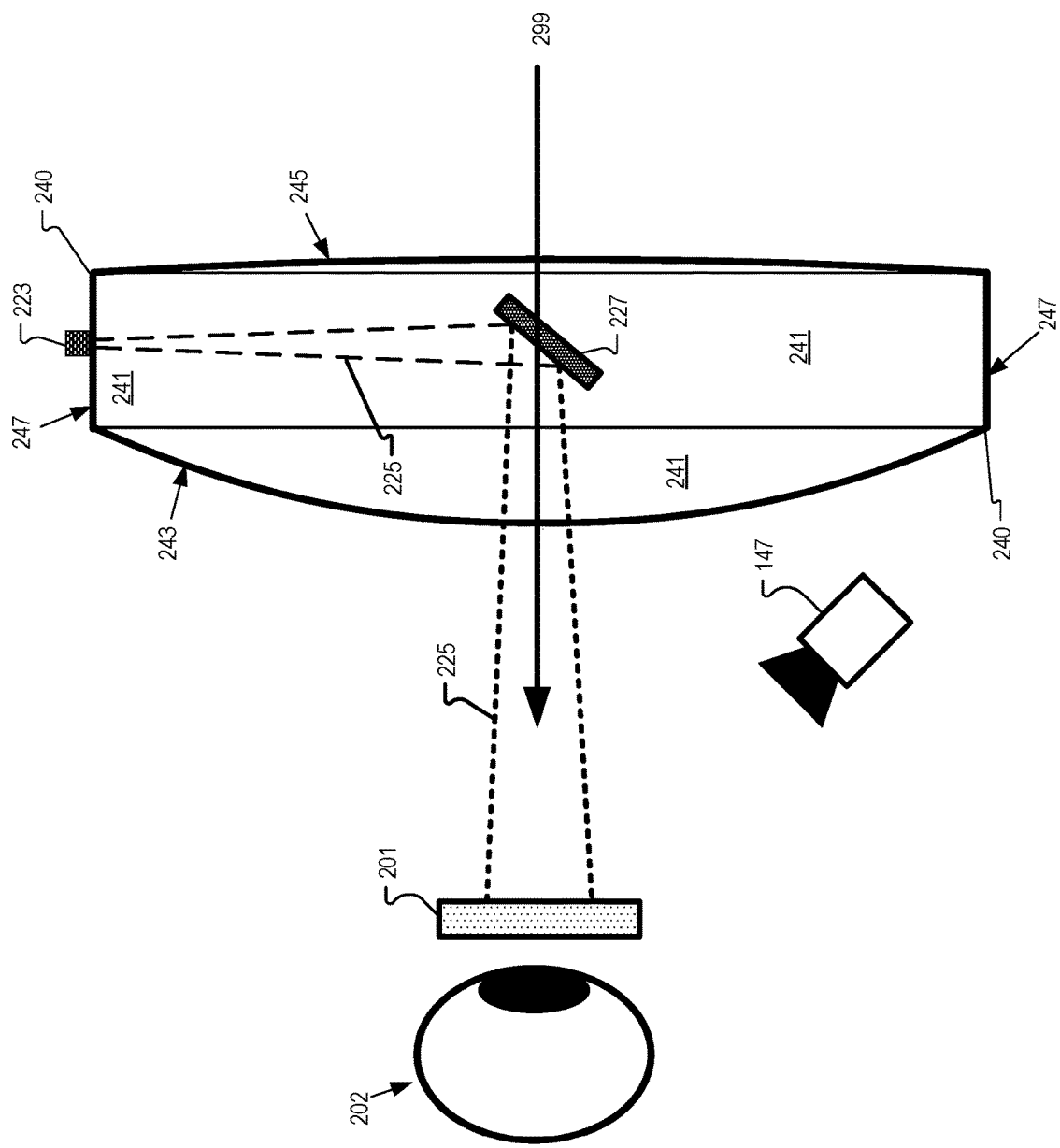
FIG. 2 illustrates an infrared illuminator emitting an infrared beam through a refractive layer to an infrared reflecting layer embedded in the refractive layer of a near-eye optical element, in accordance with an embodiment of the disclosure.

FIG. 2 illustrates an infrared illuminator 223 emitting an infrared beam 225 through a refractive layer to an infrared reflecting layer 227 embedded in the refractive layer of near-eye optical element 240, in accordance with an embodiment of the disclosure. The near-eye optical element 240 illustrated in FIG. 2 includes a refractive layer made of refractive material 241. In other embodiment, near-eye optical element 240 may include additional layers. The refractive layer made of refractive material 241 includes an eyeward side 243 disposed opposite of a scene side 245. An outside boundary 247 of the refractive layer is disposed between eyeward side 243 and scene side 245. Outside boundary 247 is disposed around the perimeter of the refractive layer and may come into contact with frame 114 of HMD 100, in FIG. 1.

Infrared illuminator 223 is configured to emit an infrared beam 225 through the refractive material 241 of the refractive layer. Infrared reflecting layer 227 is embedded in the refractive layer and configured to receive infrared beam 225 from infrared illuminator 223 and direct the infrared beam 225 out the eyeward side 243 of the refractive layer to illuminate eyebox area 201 with the infrared light from infrared beam 225. Infrared reflecting layer 227 may have a length of between 1 mm and 4 mm in some embodiments. The infrared reflecting layer 227 is surrounded by and/or immersed into refractive material 241, in FIG. 2. Refractive material 241 may be an optical grade plastic, polymer, or glass. Eyeward side 243 in combination with scene side 245 and a refractive index of material 241 may be configured according to an optical prescription of a particular user of an HMD.

Infrared reflecting layer 227 may include a dichroic multi-layer optical film configured to reflect infrared light of a particular spectrum and to pass other wavelengths of light, including the visible light. Consequently, external scene light 299 from an external environment may encounter scene side 245, propagate through refractive material 241, propagate through infrared reflecting layer 227, exit near-eye optical element 240 through eyeward side 243, and become incident on eye 202. Infrared reflecting layer 227 may be disposed on a lensing curvature having optical power. In one embodiment, the lensing curvature is formed by refractive material 241 of the refractive layer. The lensing curvature may be spherical or aspherical.

Although only one infrared illuminator 223 is illustrated for explanation purposes in FIG. 2, near-eye optical element 240 may include a second infrared illuminator configured to emit a second infrared beam and a second infrared reflecting layer embedded in the refractive layer where the second infrared reflecting layer is configured to receive the second infrared beam (propagating through refractive material 241) from the second infrared illuminator and direct the second infrared beam out the eyeward side 243 of the refractive layer to illuminate the eyebox area 201 with second infrared light. Of course, many more than two infrared illuminators and corresponding infrared reflecting layers may be utilized similarly, as illustrated in FIG. 1.

Figure 3:
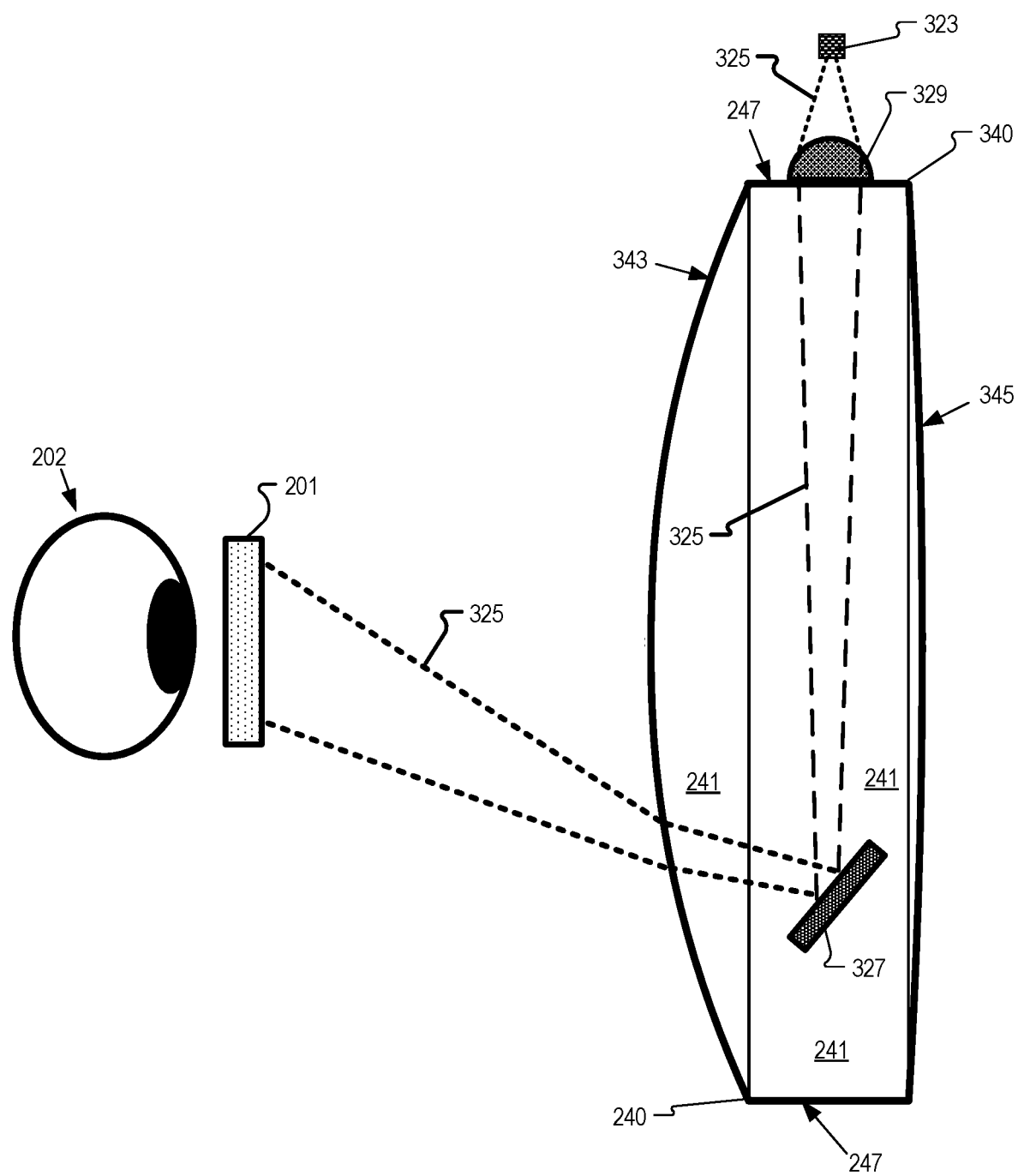
FIG. 3 illustrates a near-eye optical element including an infrared reflecting layer, an infrared illuminator, and a lens configured to focus an infrared beam from the infrared illuminator onto the infrared reflecting layer, in accordance with an embodiment of the disclosure.

FIG. 3 illustrates a near-eye optical element 340 including an infrared reflecting layer 337, an infrared illuminator 323, and a lens 329 configured to focus an infrared beam 325 from the infrared illuminator 323 onto the infrared reflecting layer 327, in accordance with an embodiment of the disclosure. Lens 329 is disposed between infrared reflecting layer 327 and infrared illuminator 323. Lens 329 is disposed on an outside boundary of the refractive layer formed by refractive material 241. Lens 329 is formed of a refractive material and has positive optical power to focus infrared beam 325 onto infrared reflecting layer 327, in FIG. 3.

In FIG. 3, infrared reflecting layer 327 is off-axis from a central optical axis of near-eye optical element 340 and the curvature of eyeward side 343 imparts optical power to the infrared beam 325 reflected by infrared reflecting layer 327.

The optical power imparted by eyeward side 343 combined with the optical power (if any) of a lensing curvature that the infrared reflecting layer 327 is disposed upon may allow infrared beam 325 to illuminate a target area of the eyebox area 201. Eyeward side 343 is disposed opposite of scene side 345.

As illustrated in FIG. 1, there may be a plurality of infrared illuminators and corresponding infrared reflecting layers positioned at different lengths from their respective infrared illuminators, in some embodiments. Therefore, some embodiments may include a plurality of lenses such as lens 329 that are configured to focus the infrared beam from a respective infrared illuminator 323 onto a respective infrared reflecting layer. The optical power of different lenses in the plurality may be different to properly focus the infrared beams from the different infrared illuminators to the corresponding infrared reflecting layers to ultimately properly project the infrared beams to the eyebox area 201.

Figure 4:
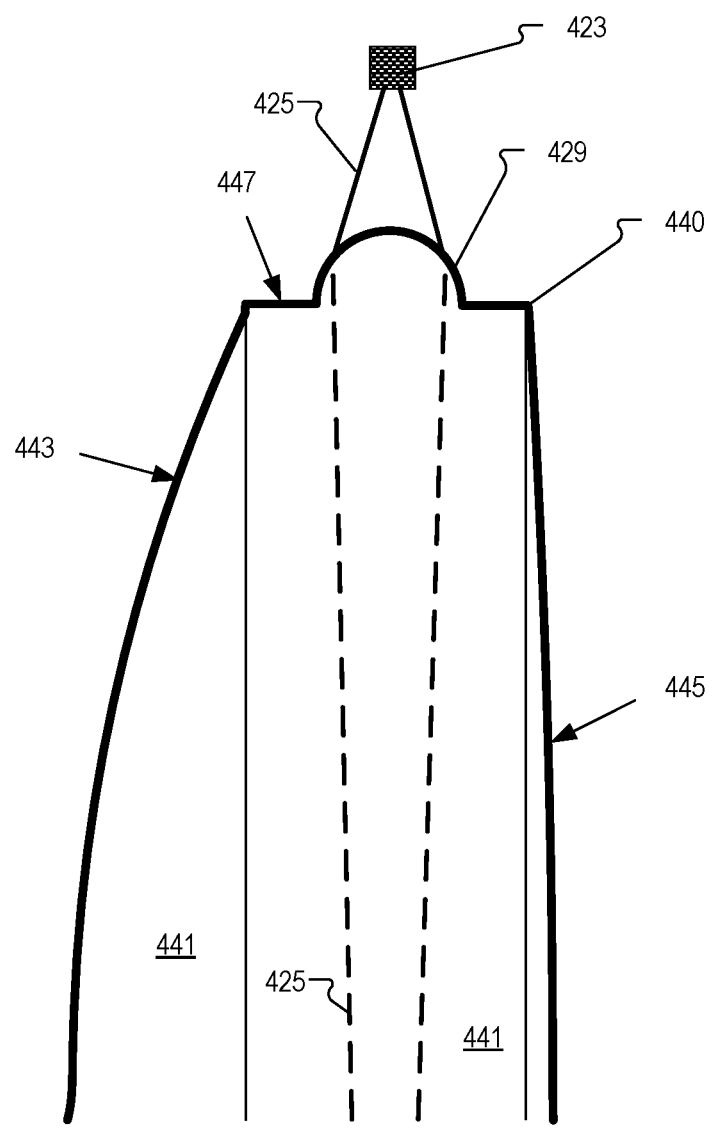
FIG. 4 illustrates a near-eye optical element having a lens formed of the same refractive material that defines the refractive layer, in accordance with an embodiment of the disclosure.

FIG. 4 illustrates a near-eye optical element 440 having a lens 429 formed of the same refractive material 441 that defines the refractive layer, in accordance with an embodiment of the disclosure. In the illustrated embodiment, lens 429 is formed of refractive material 441 that is contiguous with the refractive layer of near-eye optical element 440. One or more lenses 429 may be formed in refractive material 441 by a subtractive process (e.g. diamond turning) or in a molding process where a liquid refractive material is poured or injected into a mold and allowed to harden, for example. Incorporating the lens 429 or lenses 429 into the refractive layer of near-eye optical element 440 may increase efficiencies in both cost and time of fabricating near-eye optical element 440. In the illustrated embodiment, lens 429 is disposed on an outside boundary 427 of the refractive layer that is between eyeward side 443 and scene side 445. Lens 429 functions similarly to lens 329 and is configured to focus the infrared beam 425 emitted by infrared illuminator 423 onto an infrared reflecting layer (not illustrated in FIG. 4).

FIG. 5A-5C illustrates one example of fabricating a near-eye optical element that includes an infrared reflecting layer, in accordance with an embodiment of the disclosure. FIG. 5A illustrates a near-eye optical element 540 having an eyeward side 543 opposite a scene side 545. A refractive layer of near-eye optical element 540 is formed of a refractive material 541. FIG. 5A shows that a void 560 (represented by dashed lines) may be formed in refractive material 541. Forming void 560 may include forming a two-dimensional lensing curvature 565. Void 560 may be formed using a subtractive process such as diamond turning. Void 560 and lensing curvature 565 may be formed in a molding process, in some embodiments.

In FIG. 5B, the infrared reflecting layer 527 is formed on lensing curvature 565. Since infrared reflecting layer 527 is disposed on lensing curvature 565, lensing curvature may define the optical power of the infrared reflecting layer 527. In FIG. 5C, void 560 is filled with optical material 567. Optical material 567 may be an optical epoxy or resin. If optical material 567 is cured to allow it to harden, it may be polished to conform with a curvature of scene side 545. Optical material 567 may have a same refractive index as refractive material 541 to reduce optical artifacts generated from a boundary between optical material 567 and refractive material 541 from scene light that travels through optical material 567. Void 560 (filled with optical material 567) extends from infrared reflecting layer 527 to the scene side 545 of the refractive layer, in FIG. 5C. However, an infrared reflecting layer could also be embedded in a near-eye optical element by having a void formed from the eyeward side 543.

Of course, forming multiple voids 560 to embed multiple infrared reflecting layers 527 in a refractive layer of a near-eye optical element may be preferable when multiple infrared reflecting layers and multiple infrared illuminators are utilized.

The embodiments of FIGS. 2-5C may be incorporated into lenses 121 of HMD 100. When embodiments of the disclosure are used in an HMD configured for augmented reality (AR), at least one of the eyeward side or the scene side of the refractive layer may impart prescription optical power that assists a user of the HMD to focus on an external environment. Embodiments of this disclosure may also be utilized in virtual reality (VR) contexts that include a display and a focusing lens to present a virtual image to a user of a VR HMD. In a virtual reality context, at least one of the eyeward side or the scene side of the refractive layer may impart optical power that assists a user of the VR HMD to focus on the virtual images presented on a display of the VR HMD.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A computing device may include a desktop computer, a laptop computer, a tablet, a phablet, a smartphone, a feature phone, a server computer, or otherwise. A server computer may be located remotely in a data center or be stored locally.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A head mounted display (HMD) comprising:
   a near-eye optical element including a refractive layer having an eyeward side and a scene side, wherein the eyeward side of the refractive layer is disposed opposite of the scene side of the refractive layer;
   a first hot mirror embedded within the refractive layer between the eyeward side and the scene side;
   a second hot mirror embedded within the refractive layer between the eyeward side and the scene side;
   a first infrared illuminator configured to emit a first infrared beam propagating through the refractive layer to the first hot mirror, wherein the first hot mirror is positioned a first length from the first infrared illuminator to reflect infrared light based on a spectrum of wavelengths corresponding to the first infrared beam to direct the first infrared beam out the eyeward side of the refractive layer to illuminate an eyebox area with the infrared light, and wherein the first hot mirror is configured to pass visible light based on a wavelength of the visible light;
   a second infrared illuminator configured to emit a second infrared beam propagating through the refractive layer to the second hot mirror, wherein the second hot mirror is positioned a second length from the second infrared illuminator to reflect infrared light based on a spectrum of wavelengths corresponding to the second infrared beam to direct the second infrared beam out the eyeward side of the refractive layer to illuminate an eyebox area with the infrared light, and wherein the second hot mirror is configured to pass visible light based on a wavelength of the visible light;
   a first lens configured to focus the first infrared beam onto the first hot mirror, wherein the first lens is disposed between the first hot mirror and the first infrared illuminator on an outside boundary of the refractive layer; and
   a second lens configured to focus the second infrared beam onto the second hot mirror, wherein the second lens is disposed between the second hot mirror and the second infrared illuminator on the outside boundary of the refractive layer, wherein the first length is different from the second length and the first lens has an optical power different from an optical power of the second lens and, wherein the first lens, the second lens, and the refractive layer are a single optical element formed of a same refractive material.

2. The HMD of claim 1, wherein the first lens has positive optical power.

3. The HMD of claim 1, wherein the refractive layer includes a void extending from the first hot mirror to either the eyeward side or the scene side of the refractive layer, and wherein the void is filled with a cured optical material having a same refractive index as the refractive layer.

4. The HMD of claim 1, wherein the first infrared illuminator is one of an infrared light emitting diode (LED) or a laser diode.

5. The HMD of claim 1 further comprising:
   an eye-tracking camera positioned to capture images of an eye of a user of the HMD, wherein the eye-tracking camera includes an infrared bandpass filter that passes an infrared wavelength band corresponding to the first and second infrared beams to an image sensor of the eye-tracking camera, and wherein the infrared bandpass filter rejects light outside the infrared wavelength band.

6. The HMD of claim 1, wherein the HMD is configured for augmented reality, and wherein at least one of the eyeward side or the scene side of the refractive layer impart prescription optical power that assists a user of the HMD to focus on an external environment.

7. The HMD of claim 1 further comprising:
   a display configured to present virtual images, wherein the HMD is configured for virtual reality, and wherein at least one of the eyeward side or the scene side of the refractive layer impart optical power that assists a user of the HMD to focus on the virtual images presented on a display.

8. The HMD of claim 1, wherein the first hot mirror is disposed on a lensing curvature having optical power, and wherein the first hot mirror is disposed on the lensing curvature to illuminate a target area in the eyebox area.

9. The HMD of claim 8, wherein the lensing curvature is formed in the refractive layer.

10. The HMD of claim 8, wherein the lensing curvature is spherical.

11. A near-eye optical element comprising:
    a refractive layer having an eyeward side and a scene side, wherein the eyeward side of the refractive layer is disposed opposite of the scene side of the refractive layer;
    a plurality of hot mirrors embedded within the refractive layer between the eyeward side and the scene side, wherein a first hot mirror and a second hot mirror of the plurality of hot mirrors are configured to reflect infrared light based on a spectrum of wavelengths corresponding to respective first and second infrared beams to direct the first and second infrared beams out the eyeward side of the refractive layer to illuminate an eyebox area with the infrared light, and wherein the first and second hot mirrors are configured to pass visible light based on a wavelength of the visible light; and
    a plurality of lenses, wherein a first lens of the plurality of lenses is configured to focus the first infrared beam received from a first infrared illuminator onto the first hot mirror, and a second lens of the plurality of lenses is configured to focus the second infrared beam received from a second infrared illuminator onto the second hot mirror, wherein the first lens and the second lens are disposed on an outside boundary of the refractive layer, and wherein the first lens, the second lens, and the refractive layer are a single optical element formed of a same refractive material, wherein the first hot mirror is positioned at a first length from the first infrared illuminator and the second hot mirror is positioned at a second length from the second infrared illuminator, wherein the first length is different from the second length and the first lens has an optical power different from an optical power of the second lens.

12. The near-eye optical element of claim 11 further comprising:
    a plurality of infrared illuminators, including the first infrared illuminator and the second infrared illuminator, wherein the first infrared illuminator is configured to emit the first infrared beam to propagate through the refractive layer to the first hot mirror.

13. The near-eye optical element of claim 11 wherein the first hot mirror is disposed on a respective lensing curvature having optical power to illuminate a target area in the eyebox area.

14. The near-eye optical element of claim 13, wherein the lensing curvature is formed in the refractive layer.

\* \* \* \* \*